(No Model.) 2 Sheets—Sheet 2.

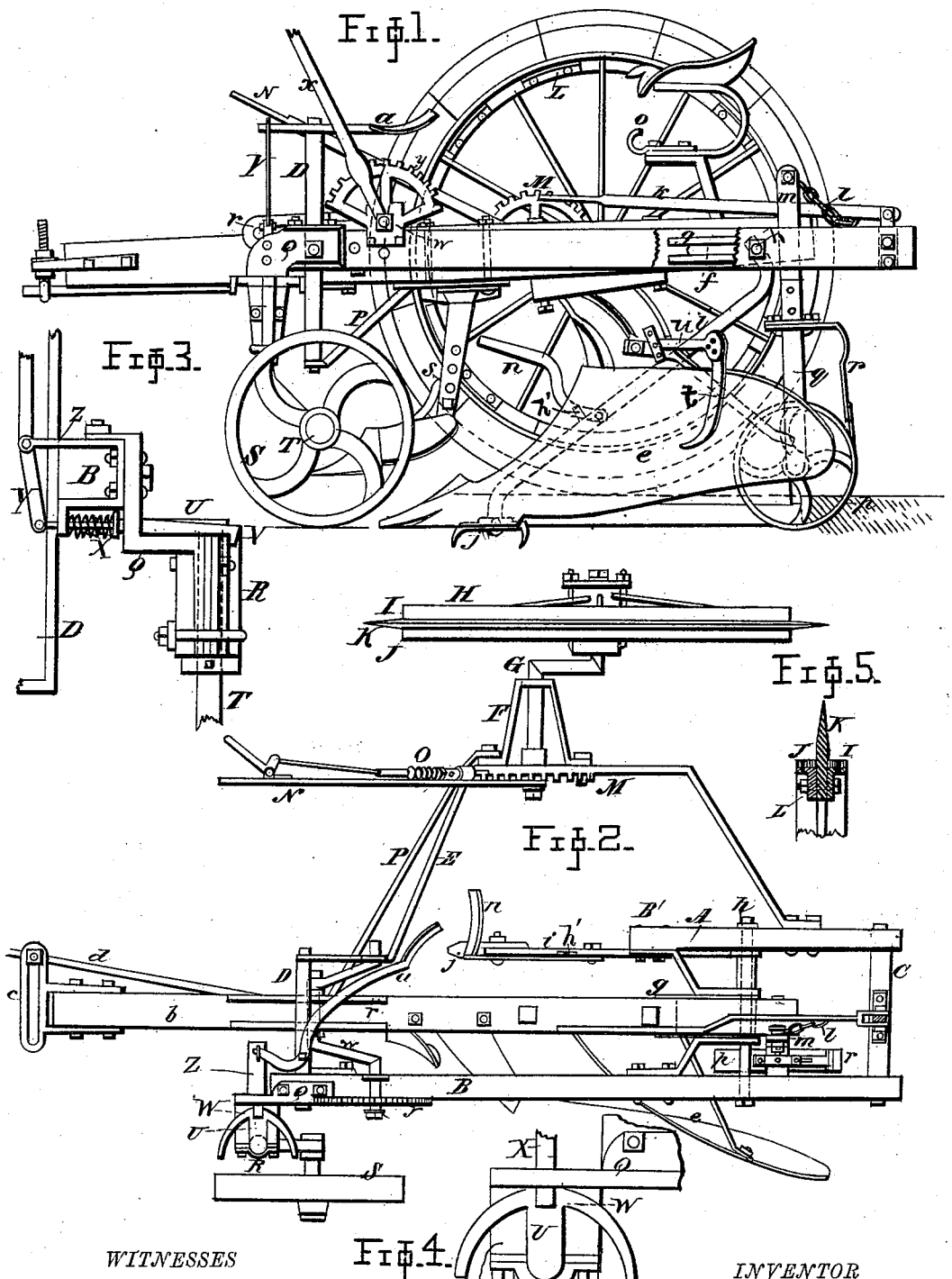

J. S. TRIMBLE.
SULKY PLOW.

No. 352,281. Patented Nov. 9, 1886.

WITNESSES
Edwin L Bradford
Geo F Brott

INVENTOR
John S. Trimble
By Tavenner & Semmes,
Attorneys

N. PETERS, Photo-Lithographer, Washington, D. C.

UNITED STATES PATENT OFFICE.

JOHN S. TRIMBLE, OF SHELBY, OHIO.

SULKY-PLOW.

SPECIFICATION forming part of Letters Patent No. 352,281, dated November 9, 1886.

Application filed February 20, 1886. Serial No. 192,629. (No model.)

*To all whom it may concern:*

Be it known that I, JOHN S. TRIMBLE, a citizen of the United States, residing at Shelby, in the county of Richland and State of Ohio, have invented certain new and useful Improvements in Sulky-Plows, of which the following is a specification, reference being had therein to the accompanying drawings.

This invention relates to certain new and useful improvements in sulky-plows, and has for its objects, first, to provide the plow with means whereby the operator can back the same without leaving his position on the plow and without backing the team, in order to disengage the plow-point from a root or other obstructions, or may back the plow for any other purpose, the feature being used because the plow is tongueless; second, to provide means whereby the forward end of the plow-beam may be raised and lowered and held in any given position, so as to give the plow the proper inclination to steer into the ground and out of the same when at the end of a row, or when it is desired to disengage the share from the ground at any point, and whereby it may be held in any given position; and, third, to provide a guiding-wheel having a cutting-edge and a caster-wheel having means for locking it against running off to either side, whereby the plow is more easily kept in a straight line, and whereby it may be easily turned around, the locking mechanism of the caster-wheel being unlocked for the latter purpose.

Figure 6:
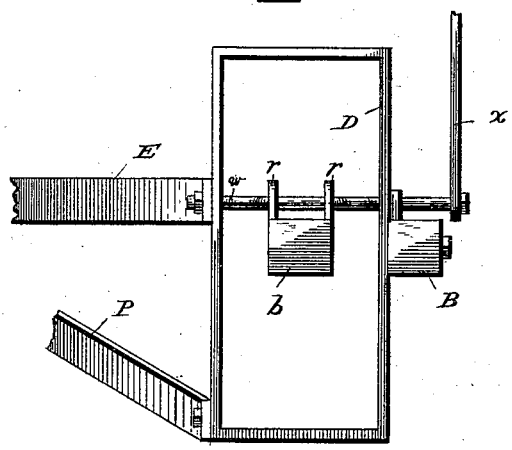
Figure 7:
Figure 8:
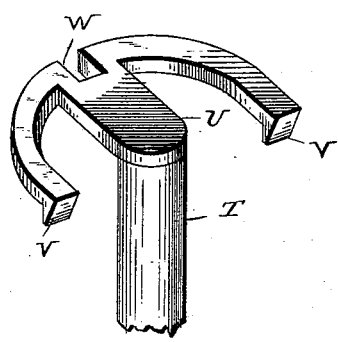
Figure 9:
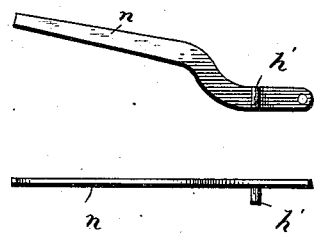

In the accompanying drawings, forming a part of this specification, and on which like reference-letters indicate corresponding parts, Figure 1 represents a side elevation of my improved plow, showing the share entered into the soil and the backing mechanism to effect the first-named object of the invention; Fig. 2, a plan view of the machine with the seat and one of the levers removed; Fig. 3, a front view of one beam of the frame, showing the mechanism for locking and unlocking the caster-wheel; Fig. 4, a plan view of that mechanism; Fig. 5, a cross-sectional view of the cutting-head and guide-wheel rim; Fig. 6, a front view of the yoke, one of the beams on the frame proper, of the plow-beam, and of the several attached devices; Fig. 7, a partial side elevation of the plow-beam, showing the slotted links secured thereto; Fig. 8, a detached perspective view of the upper portion of the caster-wheel shaft, and Fig. 9 edge and plan views of the pivoted arm carried by the anchor-bar.

The letter A designates the main frame of the plow, the same being constructed of the side beams, B, and rear end beam, C, of wood or iron. To the longer beam B is firmly bolted a metallic yoke, D, which stands in a vertical position, and to the side piece of which is bolted one end of the metallic frame E, as seen more clearly in Fig. 2, the said frame being extended laterally a proper distance, thence rearwardly, and thence laterally to a shorter beam, B', where it is also firmly bolted. This frame is provided with a bracket, F, which, together with the frame, form the bearings for the wheel-shaft G, having a crank-like bend therein, and terminating in a spindle upon which is mounted the guiding-wheel H. This wheel may be of any convenient type; but the form shown is preferred. It consists of the rims I and J, having fitted between them a series of segmental cutting-blades, K, forming collectively an annular projecting cutting-edge, which enters the ground its full width, leaving the periphery of the rims to ride upon the soil. The result of this operation is that any tendency of the plow to divert from its course to either side is counteracted. The blades also act to cut corn-stalks, weeds, and similar obstructions. These blades may be secured to the rims in any convenient manner; but the angular plates L, which are bolted to the rims and to the blades, form a convenient and preferred means of attachment. To the frame E is also secured a toothed locking segment-bar, M, and upon the shaft G is secured a lever, N, having a spring-actuated detent, O, by means of which devices the spindle of the axle is adjusted more or less under the journaled portion of the axle and the altitude of the frame E accordingly regulated and maintained in any adjusted position. A brace, P, is fastened to the frame E and to the yoke D, to give additional strengh to the structure.

To the longer beam B is firmly secured a metallic plate, Q, the lower member of which constitutes one part of the journal-box of the caster-wheel shaft, an additional cap-plate, R, being employed and secured to the plate Q to complete the said box. The caster-wheel S is mounted upon the shaft T, the vertical portion of which fits and turns freely in the said journal-box, and is provided at its upper end with a segment, U, the outer members of which curve outwardly, and their ends project downward and form lugs V. A notch, W, is also provided, with which engages the spring-actuated locking-bolt X, connected with the lever Y, pivoted to the bracket Z, which is secured, by preference, to the plate Q, as seen more clearly in Fig. 3. The upper end of the lever Y is connected with a foot-lever, a, mounted upon the yoke D. By this means the locking-bolt is withdrawn from the notch W by forcing the longer arm of the lever a with the foot in a forward direction, and the caster-wheel allowed to swing to either side, but prevented from passing too far forward in either direction by the lugs V coming in contact with the edges of the plate Q. When the foot is removed from the lever a, the bolt X will stand ready to automatically re-enter the notch W when the position of the caster-wheel admits of it. While the machine is plowing the caster-wheel is locked, and, in conjunction with the guiding-wheel, it supports the frame generally and guides or aids in guiding the plow in a straight line.

The letter b designates the plow-beam, to the forward end of which is connected a slotted clevis, c, to which is secured a draft-rod, d, so as to properly fix the point of attachment of the whiffletree, the rod being also secured to the beam.

To the beam b is bolted or otherwise secured the standard of a plow, e, of any approved type, and in the rear of the plow-standard the beam is provided with a transverse slot, f, preferably having a metallic bushing, g, and through said bushing extends a heavy bolt or shaft h, supported by the beams B B'.

The draft of the machine, other than the plow and plow-beam, causes the bolt h to occupy the rear end of the bushing g, so that if the plowshare engages a root or other impassable obstruction the plow-beam may be drawn backward the length of the bushing g, using the frame as the point of purchase, provided some means be employed to prevent the wheels and said frame of the plow from moving forward. For this purpose I have provided an anchor-bar, i, which is pivotally mounted to some part of the frame A—say to the bolt h—and provided at its lower end with a plate, j, having a plurality of flukes. A lever, k, is also pivoted to the frame A, and connected with the beam b, as by the chain l and bar m, secured to that beam. By reaching down and taking hold of the lever k and giving it a sufficient rearward movement, the anchor-bar and its flukes having been first adjusted to the ground, the operator can draw the plow-beam and its attached share rearwardly the length of the bushing g, the anchor resisting the tendency of the frame proper and the wheels to move forward. The anchor-bar is provided with a pivoted arm, n, having a stop, h', which arm serves as a foot-piece to press the flukes into the ground and as a means of suspending the anchor from the hook o or other fixed point. The position of the anchor with respect to the plowshare is such that it will fall to the unplowed ground next to the landside when disengaged.

A wheel, p, is mounted in a standard, q, secured to the rear end of the plow-beam, the wheel traveling just behind the mold-board and serving to prevent the share from dragging upon the bottom of the furrow. A scraper, r, is employed to clear the wheel p of accumulations.

A colter, s, may be employed, if desired, or, instead thereof, the sod-cutter, consisting of the blade t, adjustably secured to the arm u, adjustably attached to the plow-standard and supporting the said blade in the position shown, whereby the heavy slices of sod turned by the mold-board are broken or divided in their descent.

The arm u has a number of holes in either end, whereby it may be secured to the share-standard at different heights, the bolt which secures the same passing through one or the other of the holes, and whereby the cutter t, which has a number of registering-holes, may be secured to the bar at different angles to it.

The beam b, comparatively near the forward end, is provided with two metallic links or slotted plates, v, through which extends a crank, w, having its bearings in the frame E and the longer beam B, and provided with an adjusting-lever, x, whereby the plow-beam is raised and lowered and the pitch of the plow-share toward or from the ground regulated. By throwing the lever-rod to the rear the point of the plow will be directed upward and the share will ride out of the ground. The reverse position of the lever will direct the plow-point into the ground. A segmental rack-bar, y, is secured to the beam B, and by means of a suitable detent on the lever x the lever is locked in any set position and the plowshare maintained in the angle to the ground to which it has been adjusted.

Having thus fully described my invention, what I claim as new, and desire to secure by Letters Patent, is—

1. In a sulky-plow, the combination, with the frame proper, of the plow-beam and its plow, the beam being slidingly connected with the said frame, an anchor secured to the frame, and a lever connected with the plow-beam and mounted upon said frame and adapted to draw the beam back while the frame is held against forward movement by the anchor.

2. In a sulky-plow, the combination, with the frame proper and its supporting-wheels, of the plow-beam having a plow attached thereto and provided with an elongated opening, a bolt passing through the same and secured to the frame, an anchor and a lever pivoted to the frame, the anchor being adapted to engage the ground and the lever being connected to the beam, whereby the plow may be moved rearwardly without moving the frame proper or backing the team.

3. In a sulky-plow, the combination, with the frame proper having a bolt or shaft extending across the same, of the plow-beam having a slot therein through which the bolt passes, an anchor pivoted to the frame, extending in a forward direction and adapted to engage the ground forward of its pivotal point, and a lever mounted upon the frame and connected with the beam, by actuating which the beam is thrown back with respect to the frame.

4. In a sulky-plow, the combination, with the frame thereof, of an anchor-bar pivoted thereto, extended in a forward direction and adapted to engage the ground forward of its pivoted point.

5. In a sulky-plow, the combination, with the frame proper having a transverse bolt, a crank, and means to adjust and hold the crank, of the plow-beam having a slot which receives said bolt and slotted plates which receive said crank, and an anchor and a lever to back the beam with respect to the frame.

6. In a sulky-plow, the combination, with the plowshare and its standard, of a sod-cutter consisting of the arm having a series of holes in either end, secured at one or the other of said holes at one end to the standard, and the cutting-blade having a number of holes at one end registering with those in the arm, so as to be secured thereto at different angles, and standing substantially in a vertical line and near the share, so as to divide the sod as it falls to the ground from the share.

7. In a sulky-plow, the combination, with the frame proper and a plate secured thereto and constructed to form a bearing, of a caster-wheel having the upright portion of its shaft mounted in said bearing and provided with a segment having projections adapted to engage the plate and a notch, the spring-actuated locking-bolt, and the foot-lever connected thereto.

8. In a sulky-plow, the combination, with a plate forming a bearing, a spring-actuated locking-bolt, and a foot-lever connected therewith, of a caster-wheel having the upright portion of its shaft mounted in said bearing and provided with a segment having a notch and projecting lugs.

In testimony whereof I affix my signature in presence of two witnesses.

JOHN S. TRIMBLE.

Witnesses:
JOHN WARD,
JOSEPH R. McKNIGHT.